(12) United States Patent
Poutot et al.

(10) Patent No.: US 6,748,162 B2
(45) Date of Patent: Jun. 8, 2004

(54) VENTILATION SYSTEM FOR A MOTOR VEHICLE

(75) Inventors: Laurent Poutot, Dampierre les Bois (FR); Bruno Lucbernet, Seloncourt (FR)

(73) Assignee: Faurecia Industries, Billancourt (FR)

( * ) Notice: Subject to any disclaimer, the term of this patent is extended or adjusted under 35 U.S.C. 154(b) by 169 days.

(21) Appl. No.: 10/094,972

(22) Filed: Mar. 12, 2002

(65) Prior Publication Data
US 2002/0155804 A1 Oct. 24, 2002

(30) Foreign Application Priority Data
Mar. 12, 2001 (FR) .............................. 01 03337

(51) Int. Cl.⁷ .............................. H02P 5/00; H02P 7/67; F01P 7/10; B60K 11/00; B61D 27/00
(52) U.S. Cl. ..................... 388/800; 318/49; 318/62; 318/272; 123/41.49; 123/41.65; 180/68.1; 454/75
(58) Field of Search ................ 388/800, 907.5, 388/909; 318/49, 50, 59, 62, 139, 272, 453; 123/41.46, 41.49, 41.48, 41.65; 180/68.1; 454/75; 236/35, 74 R, 78 R, 78 A, 78 D

(56) References Cited

U.S. PATENT DOCUMENTS

| | | | |
|---|---|---|---|
| 4,539,942 A | * 9/1985 | Kobayashi et al. | 123/41.1 |
| 4,651,922 A | * 3/1987 | Noba | 123/41.49 |
| 4,765,284 A | * 8/1988 | Kanazawa et al. | 123/41.49 |
| 4,988,930 A | * 1/1991 | Oberheide | 318/82 |
| 5,483,927 A | 1/1996 | Letang et al. | 123/41.12 |
| 5,901,672 A | 5/1999 | Suzuki et al. | 123/41.49 |
| 5,947,189 A | 9/1999 | Takeuchi et al. | 165/51 |
| 6,257,832 B1 | * 7/2001 | Lyszkowski et al. | 417/2 |
| 6,463,891 B2 | * 10/2002 | Algrain et al. | 123/41.12 |
| 6,592,449 B2 | * 7/2003 | Cipolla et al. | 454/184 |

FOREIGN PATENT DOCUMENTS

| | | | |
|---|---|---|---|
| GB | 1 554 695 | 10/1979 | F01P/7/00 |
| JP | 60075715 A | * 4/1985 | F01P/7/04 |

* cited by examiner

Primary Examiner—Rina Duda
Assistant Examiner—Edgardo San Martin
(74) Attorney, Agent, or Firm—Young & Thompson

(57) ABSTRACT

A ventilation assembly for a motor vehicle comprising first and second motor fan units (1, 2) and a control device (5) adapted to vary the ventilation power ($P_{1+2}$) developed by the assembly formed by the two motor fan units according to a desired total power value ($P_{TC}$). The control device (5) comprises an electric power variator (7) with continuous power variation, connected to the first motor fan unit (1), and a means for cutting-off the supply of the second motor fan unit (2), the power ($P_2$) developed by the said second motor fan unit (2) being either zero or equal to its maximum operating power ($P_{M2}$).

19 Claims, 2 Drawing Sheets

US 6,748,162 B2

VENTILATION SYSTEM FOR A MOTOR VEHICLE

FIELD OF THE INVENTION

The invention relates to a ventilation assembly for a motor vehicle.

BACKGROUND TO THE INVENTION

The majority of vehicles are equipped with a ventilation assembly which comprises a single motor fan unit intended for cooling the engine block. However, some vehicles must have available a considerable cooling ventilation power, which necessitates the use of two motor fan units.

Ventilation assemblies for motor vehicles are already known which comprise first and second electrically-powered motor fan units, each having a respective maximum operating power, and a control device adapted to vary the ventilation power developed by the assembly formed by the two motor fan units according to a desired total power value.

In these known ventilation assemblies, the control of the two motor fan units is effected either discontinuously, the motor fan units being supplied with power by way of switched resistive circuits, or continuously, in which case provision is made to use an electronic power variation device for each motor fan unit or to use only one electronic power variation device by connecting the two motor fan units in parallel.

In the case of discontinuous control, access can be had to only a limited number of speeds and therefore of ventilation powers.

In the case of control with continuous variation of known type, the use of two electronic power variation devices entails a significant extra cost which is not generally compatible with the price levels aimed for in the motor vehicle industry.

On the other hand, the association in parallel of two motor fan units controlled by a single electronic variator raises vibro-acoustic problems due to beating since the two motor fan units are almost identical. Whichever motor fan units are used, problems of electromagnetic radiation also arise due to the use, by the electronic variators, of chopped current with variable cyclical ratio at high frequency. The transport of this current between the two motor fan units consequently necessitates the use of shielding or filtering devices.

SUMMARY OF THE INVENTION

A principal aim of the invention is to propose a ventilation assembly with two motor fan units in which the total power is variably controlled continuously, thus remedying the aforesaid drawbacks.

To this end, according to the invention, the control device comprises an electric power variator with continuous power variation, connected to the first motor fan unit, and a means for cutting-off the supply of the second motor fan unit, the power developed by the said second motor fan unit being either zero or equal to its maximum operating power.

According to other features of the invention:
  the control device comprises an electronic calculating device which receives at the input an input desired value signal signifying the desired total ventilation power, and delivers at the output, on the one hand an output desired value signal to the variator, signifying the desired ventilation power of the first motor fan unit, and on the other hand a control signal to the cut-off means, signifying the desired state of the second motor fan unit, the sum of the desired power of the first motor fan unit and of the power developed by the second motor fan unit being equal to the desired total power;
  over a low speed operating range, corresponding to desired total power values below a predetermined first threshold value, the desired power of the first motor fan unit is equal to the desired total power, while the signal for control of the cut-off means is a cut-off signal, the maximum operating power of the first motor fan unit being greater than the ventilation power corresponding to the first threshold value;
  over a high speed operating range, corresponding to desired total power values above a predetermined second threshold value, the signal for control of the cut-off means is a supply signal, while the desired power of the first motor fan unit is equal to the desired total power reduced by the value of the maximum operating power of the second motor fan unit, said maximum power being less than the desired total power at the point of operation corresponding to the second threshold value;
  at a point of operation of the range of desired total power values comprised between the two threshold values, the desired power of the first motor fan unit is:
  either equal to the desired total power while the signal for controlling the cut-off means is a cut-off signal, in the case where said point of operation is reached when the second motor fan unit is not supplied;
  or equal to the desired total power reduced by the maximum operating power of the second motor fan unit while the signal for controlling the cut-off means is a supply signal, in the case where said point of operation is reached when the second motor fan unit is supplied;
  the power corresponding to the first threshold value is between the maximum operating power of the second motor fan unit and the average of the maximum powers of the two motor fan units;
  the power corresponding to the second threshold value is between the average of the maximum powers of the two motor fan units and the maximum operating power of the first motor fan unit;
  the ratio of the power corresponding to the first threshold value, to the maximum operating power of the first motor fan unit is between 0.65 and 0.75;
  the ratio of the power corresponding to the second threshold value, to the maximum operating power of the first motor fan unit is between 0.85 and 0.95; and
  the maximum operating power of the second motor fan unit is selected from a range of values between 0.5 and 0.8 times the maximum operating power of the first motor fan unit.

Another aim of the invention is a method for controlling a ventilation assembly as described previously, in which the following steps are carried out:
  the desired total power is compared with a second threshold value;
  if the desired total power is above the said second threshold value, the second motor fan unit is supplied at its maximum operating power, and the first motor fan unit at a power equal to the desired total power reduced by the maximum operating power of the second motor fan unit;
  if the desired total power is below the second threshold value, the desired total power is compared with a first threshold value;

if in addition the desired total power is below the said first threshold value S1, the first motor fan unit is supplied at a power equal to the desired total power and the second motor fan unit is not supplied;

if on the contrary the desired total power is above the said first threshold value S1, in the case where the second motor fan unit is not supplied, the first motor fan unit is supplied at a power equal to the desired total power and the second motor fan unit is not supplied, and in the case where the second motor fan unit is supplied, the first motor fan unit is supplied at a power equal to the desired total power reduced by the maximum operating power of the second motor fan unit and the second motor fan unit is supplied at its maximum power.

BRIEF DESCRIPTION OF DRAWINGS

Exemplary embodiments of the invention will now be described with reference to the appended drawings, in which.

DESCRIPTION OF PREFERRED EMBODIMENT

Figure 1:
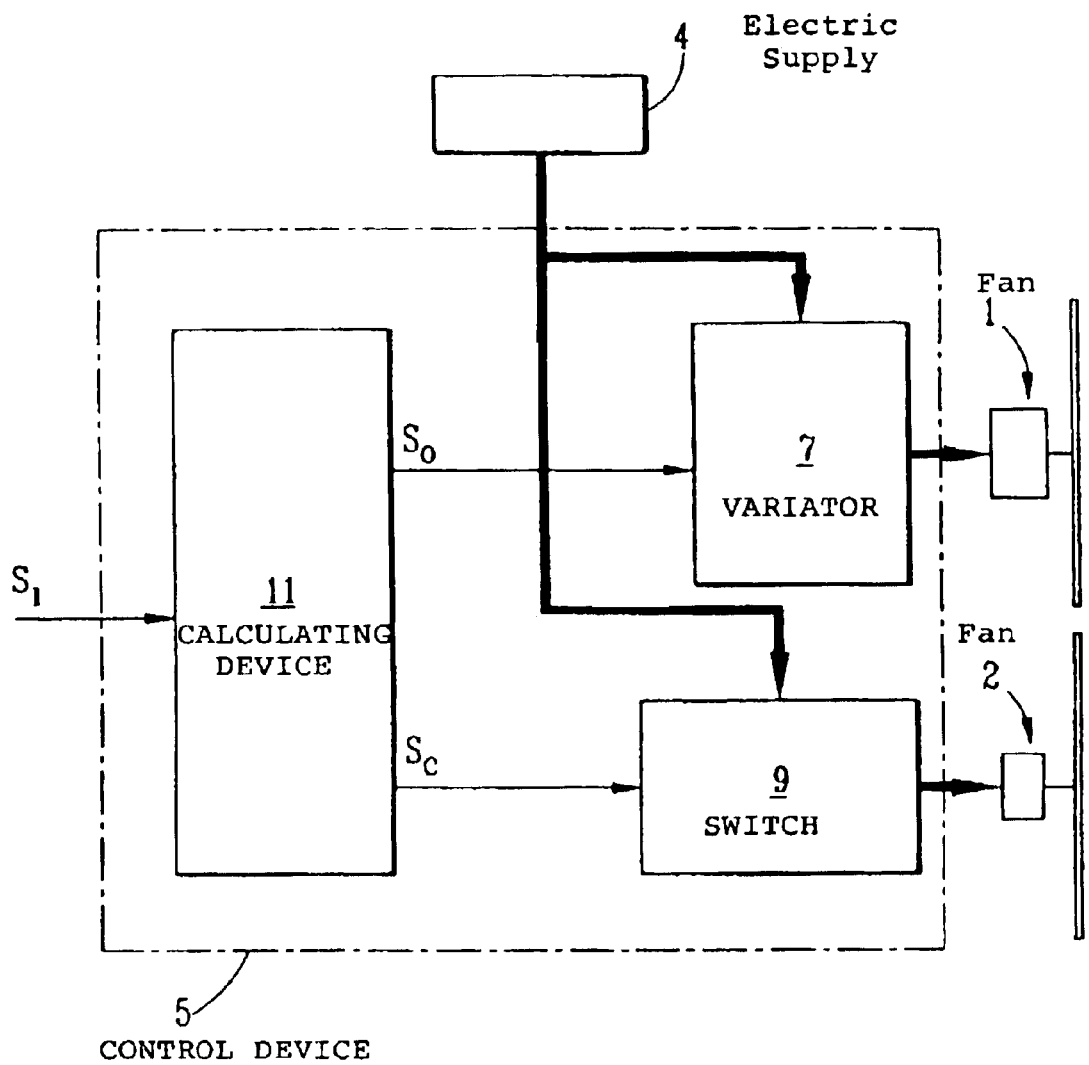
FIG. 1 is a diagram representing a ventilation assembly according to the invention.

FIG. 1 shows two motor fan units 1, 2 of different powers belonging to a ventilation assembly intended for equipping a motor vehicle.

For example, the two motor fan units are selected such that their total available ventilation power is about 160 watts. For this purpose, in the embodiment to be described, the first motor fan unit 1 is selected such that its maximum operating power is about 100 watts, and the second motor fan unit 2 is selected such that its maximum operating power is about 60 watts.

The two motor fan units 1, 2 are supplied by an electrical supply 4 available on the vehicle, by way of a control device 5.

The control device 5 receives at the input an input desired value signal $S_i$ signifying a desired total ventilation power, this desired power being determined for example by parameters of the state of the cooling circuit which are associated with the ventilation assembly, in particular cooling fluid temperature data.

The control device 5 comprises an electronic power variator 7 associated with the first motor fan unit 1 and a switch 9 associated with the second motor fan unit 2. The term switch obviously designates any device adapted for cutting-off the supply, subject to a control signal, and may consist for example of a relay or a power transistor.

The control device 5 on the other hand comprises an electronic calculating device 11 which receives the input desired value signal $S_i$ and delivers at the output, on the one hand an output desired value signal $S_0$ directed towards the variator 7, and on the other hand a signal $S_C$ for controlling the switch 9.

The variator 7 regulates, according to the output desired value signal $S_0$, the level of electrical power delivered to the first motor fan unit 1 by the electrical supply 4.

The switch 9 allows or prohibits the supply of the second motor fan unit 2 by the electrical supply 4, depending on whether the control signal $S_C$ is a cut-off signal or a supply signal.

Figure 2:
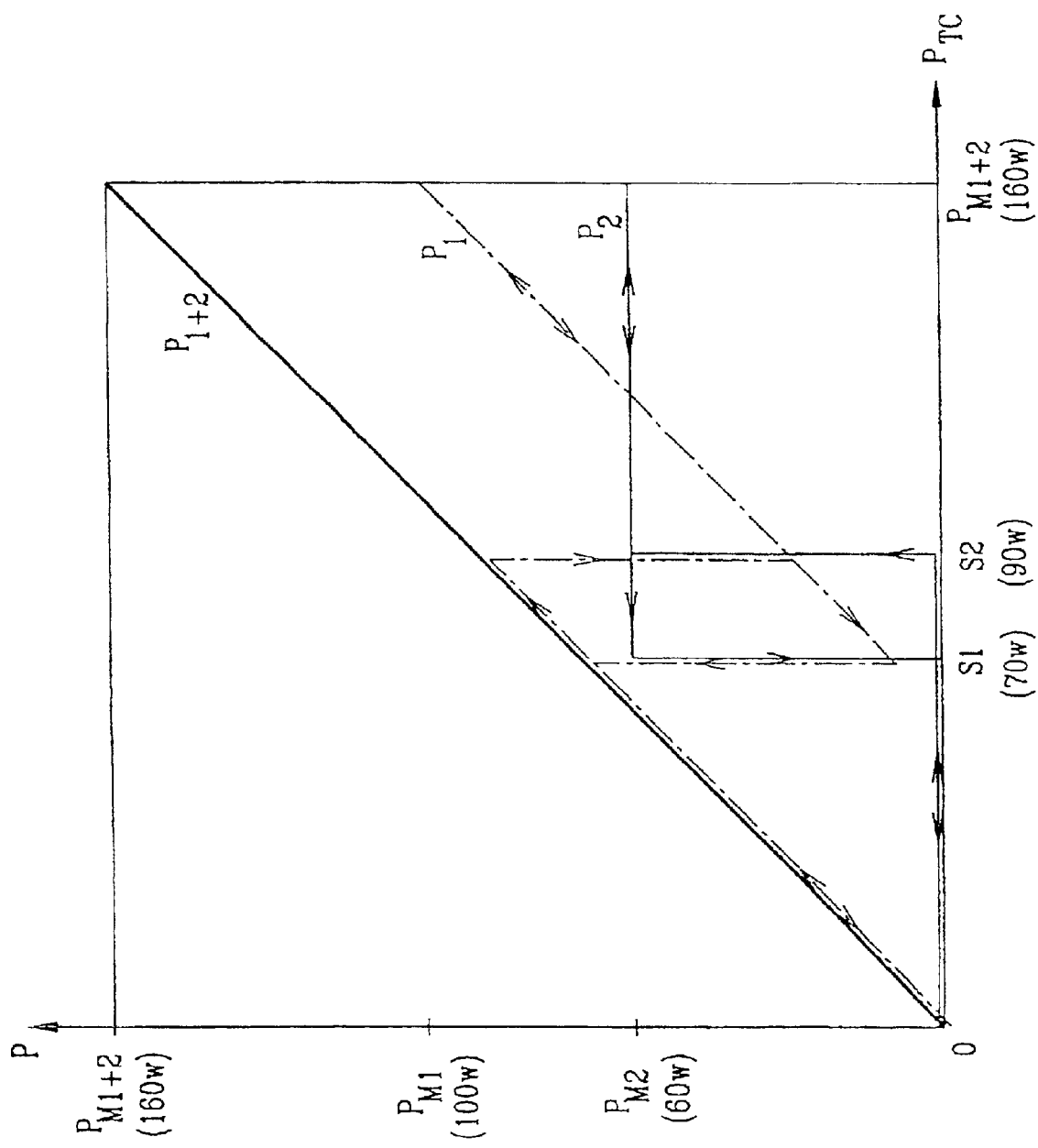
FIG. 2 is a graph representing the total ventilation power developed by the ventilation assembly, and also the respective powers developed by the two motor fan units, according to the desired total ventilation power.

With reference to FIG. 2, the method of operation of the control device 5, and in particular of the electronic calculating device 11, will now be described.

The graph shows the course of the powers developed respectively by the first motor fan unit 1, and the second motor fan unit 2, these powers being respectively designated by the references $P_1$, $P_2$. The total power developed by the assembly formed of the two motor fan units 1, 2 has been designated by the reference $P_{1+2}$, and corresponds to the sum of the respective powers $P_1$, $P_2$ of the two motor fan units taken individually. The course of the powers $P_1$, $P_2$, $P_{1+2}$ is shown according to the desired total power $P_{TC}$ which corresponds to the desired value signal $S_i$.

It will be understood that the output desired value signal $S_0$ delivered to the variator 7 by the electronic calculating device 11 signifies the power $P_1$, and that the signal $S_C$ for controlling the switch 9 is a signal of the binary type (0 or 1) signifying the power $P_2$.

As can be seen on the graph in FIG. 2, three operating ranges can be distinguished, corresponding to ranges of desired total power $P_{TC}$:

for the desired total power values $P_{TC}$ between 0 and a first threshold value $S_1$, only the first motor fan unit is set in operation. The signal $S_C$ for controlling the switch 9 is a cut-off signal, therefore the power $P_2$ of the second motor fan unit 2 is zero. On the other hand, the output desired value signal $S_0$ delivered to the variator 7 corresponds to a power $P_1$ equal to the desired total power $P_{TC}$. In this operating range there is therefore identity between the power of the assembly $P_{1+2}$ and the power of the first motor fan unit $P_1$;

for desired total power values $P_{TC}$ between a second threshold value $S_2$, higher than the first threshold value $S_1$, and the maximum operating power of the assembly $P_{M1+2}$, equal to the sum of the respective maximum operating powers of the two motor fan units $P_{M1}$ and $P_{M2}$, the signal $S_C$ for controlling the switch 9 is a supply signal. The power $P_2$ of the second motor fan unit 2 is therefore brought to its maximum operating power $P_{M2}$, while the output desired value signal $S_0$ regulates the variator 7 such that the power $P_1$ of the first motor fan unit is equal to the desired total power $P_{TC}$ reduced by the maximum operating power $P_{M2}$ of the second motor fan unit;

for desired total power values $P_{TC}$ between the two threshold values $S_1$ and $S_2$, two cases can be distinguished. When passing from an initial point of operation to the point of operation corresponding to the desired value, the respective desired powers of the two motor fan units are determined according to the initial state, that is to say that the electronic calculating device 11 delivers a control signal $S_C$ to the switch 9 which takes into account the initial state of said switch 9.

In the present instance, if the second motor fan unit is supplied in the initial state, the signal $S_C$ for controlling the switch 9 at the point of operation is a supply signal. As a result, the power $P_2$ of the second motor fan unit 2 is maintained at its maximum operating power $P_{M2}$, while the power $P_1$ of the first motor fan unit 1 is regulated at the desired total power $P_{TC}$ reduced by the maximum operating power $P_{M2}$ of the second motor fan unit.

If, on the contrary, the second motor fan unit 2 is not supplied in the initial state, the signal $S_C$ for controlling the switch 9 remains a cut-off signal and the power $P_2$ of the second motor fan unit remains zero, the power $P_1$ of the first motor fan unit being equal to the desired total power $P_{TC}$.

Each of the two motor fan units 1, 2 therefore operates according to a hysteresis cycle, the triggering thresholds $S_1$, $S_2$ of which are identical for both.

This type of operation avoids too short triggering/cut-off cycles of the motor fan units, which would be produced in the case of a single threshold when the desired total power varies round this threshold value.

The threshold values $S_1$, $S_2$ are pre-recorded in the electronic calculating device 11 and may be either fixed or adjustable, depending on whether the calculating device is provided for use with different types of motor fan units or limited to a single configuration.

It is deemed to be preferable to select the threshold values $S_1$ and $S_2$ respectively in the ranges comprised on the one hand between the maximum power of the second motor fan unit $P_{M2}$ and the average of the two maximum powers, that is to say $$\frac{P_{M1} + P_{M2}}{2},$$

and on the other hand between this same average $$\frac{P_{M1} + P_{M2}}{2}$$

and the maximum power of the first motor fan unit $P_{M1}$.

In order to obtain good reliability of the ventilation assembly, it is necessary to reduce as far as possible the repetition of triggering and cut-offs of the second motor fan unit. For this purpose, triggering threshold values $S_1$, $S_2$ which are sufficiently spaced are selected, it being obvious that the first threshold value $S_1$ must be above the maximum operating power $P_{M2}$ of the second motor fan unit, and that the second threshold value $S_2$ must be below the maximum operating power $P_{M1}$ of the first motor fan unit 1.

For example, threshold values $S_1$, $S_2$ will be taken which are respectively equal to 70 watts and 90 watts.

More generally, it is deemed that the operation of the ventilation assembly is optimum for a first threshold value $S_1$ between 0.65 and 0.75 times the maximum operating power $P_{M1}$ of the first motor fan unit, and for a second threshold value $S_2$ between 0.85 and 0.95 times the maximum operating power $P_{M1}$ of the first motor fan unit 1.

It is self-evident that the maximum operating power values of the two motor fan units have been given only by way of indication, and that the invention may be applied whatever the total maximum power and its distribution between the two motor fan units, under the prior conditions mentioned previously.

However, it is preferable to associate two motor fan units operating in fields permitting them to be stressed in a balanced manner during the most current phases of use, while limiting the cut-off/supply cycles.

For this purpose, it is deemed that the ratio of the maximum operating power of the second motor fan unit to the maximum operating power of the first motor fan unit may advantageously be selected to be between 0.5 and 0.8.

As has already been mentioned previously, it may be necessary to provide adjustable threshold values $S_1$, $S_2$. Such adjustment may be effected simply by programming the electronic calculating device 11, thus rendering the control device 5, and more generally the ventilation assembly according to the invention, adaptable to numerous cases of figures and to numerous vehicles. The adaptation may target different types of motor fan units, but also different types of vehicle engine, cooling circuit or other equipment present on the vehicles.

As can be seen, the invention requires a relatively small number of components, of conventional type, which represent a small overall space requirement allowing the control device 5 to be incorporated in one of the two motor fan units. As a result, any transmission of high frequency current between the two motor fan units can be avoided.

On the other hand, the control device can operate even if only one motor fan unit is fitted, thus providing great flexibility in use and making it possible to adapt the control device to a large number of different vehicles. In that case the switch device 9 is not used.

It will also be observed that the operation by hysteresis cycle of the two motor fan units provides stability of operation and therefore great reliability.

What is claimed is:

1. A ventilation assembly for a motor vehicle, the assembly comprising first and second electrically-powered motor fan units (1, 2), each having a respective maximum operating power ($P_{M1}$, $P_{M2}$), and a control device (5) adapted to vary the ventilation power ($P_{1+2}$) developed by the assembly formed by the two motor fan units (1, 2) according to a desired total ventilation power value ($P_{TC}$), the control device (5) comprising an electric power variator (7) with continuous power variation, connected to the first motor fan unit (1), and a means (9) for cutting-off the electric power supply of the second motor fan unit (2), wherein the ventilation power ($P_2$) developed by the said second motor fan unit (2) is either zero or equal to its maximum operating power ($P_{M2}$).

2. A ventilation assembly according to claim 1, wherein the control device (5) has an input and an output, said control device comprising an electronic calculating device (11) which receives at the input an input desired value signal ($S_1$) signifying the desired total ventilation power ($P_{TC}$), and delivers at the output, on the one hand an output desired value signal ($S_O$) to said variator (7), signifying the desired ventilation power of the first motor fan unit (1), and on the other hand a control signal ($S_C$) to the cut-off means (9), signifying the desired state of the second motor fan unit (2), the sum of the desired power of the first motor fan unit (1) and of the ventilation power ($P_2$) developed by the second motor fan unit (2) being equal to the desired total ventilation power ($P_{TC}$).

3. A ventilation assembly according to claim 2, wherein over a low speed operating range, corresponding to desired total ventilation power values ($P_{TC}$) below a predetermined first threshold value (S1), the desired power of the first motor fan unit (1) is equal to the desired ventilation total power ($P_{TC}$), while the signal ($S_C$) for controlling the cut-off means (9) is a cut-off signal, the maximum operating power ($P_{M1}$) of the first motor fan unit (1) being higher than the ventilation power corresponding to the first threshold value (S1).

4. A ventilation assembly according to claim 3, wherein over a high speed operating range, corresponding to desired total ventilation power values ($P_{TC}$) above a predetermined second threshold value (S2), the signal ($S_C$) for controlling the cut-off means (9) is a supply signal, while the desired ventilation power of the first motor fan unit (1) is equal to the desired total ventilation power ($P_{TC}$) reduced by the value of the maximum operating power ($P_{M2}$) of the second motor fan unit (2), the said maximum power being lower than the desired total ventilation power ($P_{TC}$) at the point of operation corresponding to the second threshold value (S2).

5. A ventilation assembly according to claim 4, wherein at a point of operation of the range of desired total ventilation power values ($P_{TC}$) comprised between the two threshold values (S1, S2), the desired power of the first motor fan unit (1) is:

either equal to the desired total ventilation power ($P_{TC}$) while the signal ($S_C$) for controlling the cut-off means (9) is a cut-off signal, in the case where the said point of operation is reached when the second motor fan unit (2) is not supplied;

or equal to the desired total ventilation power ($P_{TC}$) reduced by the maximum operating power ($P_{M2}$) of the second motor fan unit (2) while the signal ($S_C$) for controlling the cut-off means (9) is a supply signal, in the case where the said point of operation is reached when the second motor fan unit (2) is supplied.

6. A ventilation assembly according to claim 3, wherein the power corresponding to the first threshold value ($S_1$) is between the maximum operating power ($P_{M2}$) of the second motor fan unit (2) and the average $$\frac{P_{M1} - P_{M2}}{2}$$

of the maximum operating powers ($P_{M1}$, $P_{M2}$) of the two motor fan units (1, 2).

7. A ventilation assembly according to claim 4, wherein the power corresponding to the first threshold value ($S_1$) is between the maximum operating power ($P_{M2}$) of the second motor fan unit (2) and the average $$\frac{P_{M1} - P_{M2}}{2}$$

of the maximum operating powers ($P_{M1}$, $P_{M2}$) of the two motor fan units (1, 2).

8. A ventilation assembly according to claim 5, wherein the power corresponding to the first threshold value ($S_1$) is between the maximum operating power ($P_{M2}$) of the second motor fan unit (2) and the average $$\frac{P_{M1} + P_{M2}}{2}$$

of the maximum operating powers ($P_{M1}$, $P_{M2}$) of the two motor fan units (1, 2).

9. A ventilation assembly according to claim 4, wherein the power corresponding to the second threshold value ($S_2$) is between the average $$\frac{P_{M1} + P_{M2}}{2}$$

of the maximum operating powers ($P_{M1}$, $P_{M2}$) of the two motor fan units (1, 2) and the maximum operating power ($P_{M1}$) of the first motor fan unit (1).

10. A ventilation assembly according to claim 3, wherein the ratio of the power corresponding to the first threshold value (S1), to the maximum operating power ($P_{M1}$) of the first motor fan unit (1) is between 0.65 and 0.75.

11. A ventilation assembly according to claim 4, wherein the ratio of the power corresponding to the first threshold value (S1), to the maximum operating power ($P_{M1}$) of the first motor fan unit (1) is between 0.65 and 0.75.

12. A ventilation assembly according to claim 9, wherein the ratio of the power corresponding to the first threshold value (S1), to the maximum operating power ($P_{M1}$) of the first motor fan unit (1) is between 0.65 and 0.75.

13. A ventilation assembly according to claim 4, characterised in that the ratio of the power corresponding to the second threshold value (S2), to the maximum operating power ($P_{M1}$) of the first motor fan unit (1) is between 0.85 and 0.95.

14. A ventilation assembly according to claim 9, characterised in that the ratio of the power corresponding to the second threshold value (S2), to the maximum operating power ($P_{M1}$) of the first motor fan unit (1) is between 0.85 and 0.95.

15. A ventilation assembly according claim 3, wherein the maximum operating power ($P_{M2}$) of the second motor fan unit (2) is selected from a range of values between 0.5 and 0.8 times the maximum operating power ($P_{M1}$) of the first motor fan unit (1).

16. A ventilation assembly according claim 4, wherein the maximum operating power ($P_{M2}$) of the second motor fan unit (2) is selected from a range of values between 0.5 and 0.8 times the maximum operating power ($P_{M1}$) of the first motor fan unit (1).

17. A ventilation assembly according claim 9, wherein the maximum operating power ($P_{M2}$) of the second motor fan unit (2) is selected from a range of values between 0.5 and 0.8 times the maximum operating power ($P_{M1}$) of the first motor fan unit (1).

18. A method for controlling a ventilation assembly comprising first and second electrically-powered motor fan units (1,2), each having a respective maximum operating power ($P_{M1}$, $P_{M2}$), and a control device (5) adapted to vary the ventilation power ($P_{1+2}$) developed by the assembly formed by the two motor fan units (1, 2) according to a desired total ventilation power value ($P_{TC}$), the control device (5) comprising an electric power variator (7) with continuos power variation, connected to the first motor fan unit (1), and a means (9) for cutting-off the electric power supply of the second motor fan unit (2), wherein the ventilation power ($P_2$) developed by the said second motor fan unit (2) is either zero or equal to its maximum operating power ($P_{M2}$), where the method comprises the following steps:

the desired total ventilation power ($P_{TC}$) is compared with a second threshold (S2);

if the desired total ventilation power ($P_{TC}$) is above the said second threshold value (S2), the second motor fan unit (2) is supplied at its maximum operating power ($P_{M2}$), and the first motor fan unit (1) at a power equal to the desired total ventilation power ($P_{TC}$) reduced by the maximum operating power ($P_{M2}$) of the second motor fan unit (2);

if the desired total ventilation power ($P_{TC}$) is below the second threshold value (S2), the desired total ventilation power ($P_{TC}$) is compared with a first threshold value (S1);

if, in addition, the desired total ventilation power ($P_{TC}$) is below the said first threshold value S1, the first motor fan unit (1) is supplied at a power equal to the desired total ventilation power ($P_{TC}$) and the second motor fan unit (2) is not supplied;

if, on the contrary, the desired total ventilation power ($P_{TC}$) is above the said first threshold value (S1), in the case where the second motor fan unit (2) is not supplied, the first motor fan unit (1) is supplied at a power equal to the desired total ventilation power ($P_{TC}$) and the second motor fan unit (2) is not supplied, and in the case where the second motor fan unit (2) is supplied, the first motor fan unit (1) is supplied at a power equal to the desired ventilation total power ($P_{TC}$) reduced by the maximum operating power ($P_{M2}$) of the second motor fan unit (2) and the second motor fan unit (2) is supplied at its maximum operating power ($P_{M2}$).

19. A method for controlling a ventilation assembly comprising first and second electrically-powered motor fan units (1, 2) each having a respective maximum operating power ($P_{M1}$, $P_{M2}$), and a control device (5) adapted to vary the ventilation power ($P_{1+2}$) developed by the assembly formed by the two motor fan units (1, 2) according to a desired total ventilation power value ($P_{TC}$), the control device (5) comprising an electric power variator (7) with continuos power variation, connected to the first motor fan unit (1), and a means (9) for cutting-off the electric power supply of the second motor fan unit (2), wherein the ventilation power ($P_2$) developed by the said second motor fan unit (2) is either zero or equal to its maximum operating power ($P_{M2}$), the control device (5) has an input and an output, said control device comprising an electronic calculating device (11) which receives at the input desired value signal ($S_1$) signifying the desired total ventilation power ($P_{TC}$), and delivers at the output, on the one hand an output desired value signal ($S_0$) to said variator (7), signifying the desired ventilation power of the first motor fan unit (1), and on the other hand a control signal ($S_C$) to the cut-off means (9), signifying the desired state of the second motor fan unit (2), the sum of the desired power of the first motor fan unit (1) and of the ventilation power ($P_2$) developed by the second motor fan unit (2) being equal to the desired total ventilation power ($P_{TC}$), and over a low speed operating range, corresponding to desired total ventilation power values ($P_{TC}$) below a predetermined first threshold value (S1), the desired power of the first motor fan unit (1) is equal to the desired ventilation total power ($P_{TC}$), while the signal ($S_C$) for controlling the cut-off means (9) is a cut-off signal, the maximum operating power ($P_{M1}$) of the first motor fan unit (1) being higher than the ventilation power corresponding to the first threshold value (S1), where the method comprises the following steps:

the desired total ventilation power ($P_{TC}$) is compared with a second threshold value (S2);

if the desired total ventilation power ($P_{TC}$) is above the said second threshold value (S2), the second motor fan unit (2) is supplied at its maximum operating power ($P_{M2}$), and the first motor fan unit (1) at a power equal to the desired total ventilation power ($P_{TC}$) reduced by the maximum operating power ($P_{M2}$) of the second motor fan unit (2);

if the desired total ventilation power ($P_{TC}$) is below the second threshold value (S2), the desired total ventilation power ($P_{TC}$) is compared with a first threshold value (S1);

if, in addition, the desired total ventilation power ($P_{TC}$) is below the said first threshold value (S1), the first motor fan unit (1) is supplied at a power equal to the desired total ventilation power ($P_{TC}$) and the second motor fan unit (2) is not supplied;

if, on the contrary, the desired total ventilation power ($P_{TC}$) is above the said first threshold value (S1), in the case where the second motor fan unit (2) is not supplied, the first motor fan unit (1) is supplied at a power equal to the desired total ventilation power ($P_{TC}$) and the second motor fan unit (2) is not supplied, and in the case where the second motor fan unit (2) is supplied, the first motor fan unit (1) is supplied at a power equal to the desired total ventilation power ($P_{TC}$) reduced by the maximum operating power ($P_{M2}$) of the second motor fan unit (2) and the second motor fan unit (2) is supplied at its maximum power ($P_{M2}$).

* * * * *